(No Model.)

G. CAMPBELL.
PULLEY.

No. 362,569. Patented May 10, 1887.

Witnesses.
F. B. Fetherstonhaugh.
Chas H. Riches.

Inventor:
G. Campbell
by Donald C. Ridout &co
Atty

UNITED STATES PATENT OFFICE.

GEORGE CAMPBELL, OF TORONTO, ONTARIO, CANADA, ASSIGNOR OF ONE-HALF TO LEO FRANKEL, OF SAME PLACE.

PULLEY.

SPECIFICATION forming part of Letters Patent No. 362,569, dated May 10, 1887.

Application filed August 21, 1886. Serial No. 211,492. (No model.)

*To all whom it may concern:*

Be it known that I, GEORGE CAMPBELL, of the city of Toronto, in the county of York, in the Province of Ontario, Canada, blacksmith, have invented certain new and useful Improvements in Pulleys, of which the following is a specification.

The object of the invention is to construct a pulley possessing great strength in proportion to its weight; and it consists in the peculiar combinations and the novel construction and arrangement of parts, all as more fully hereinafter described and claimed.

Figure 1:
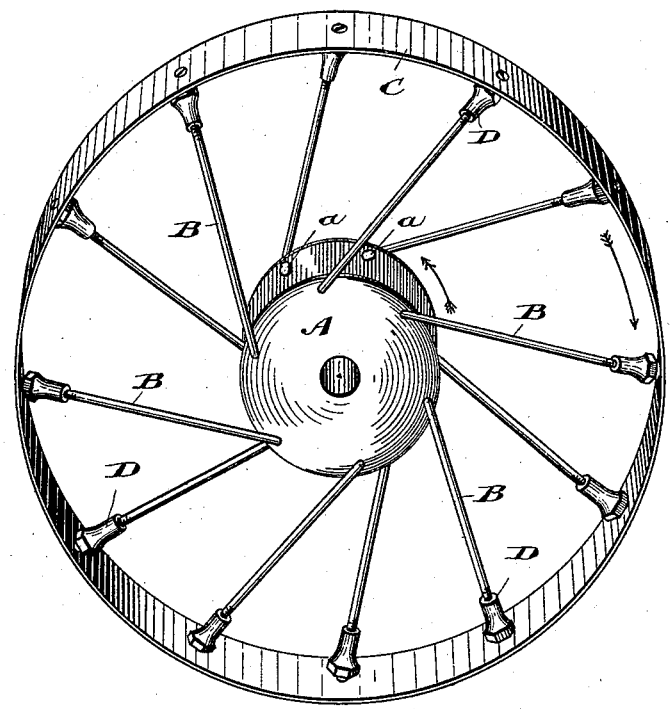
Figure 2:
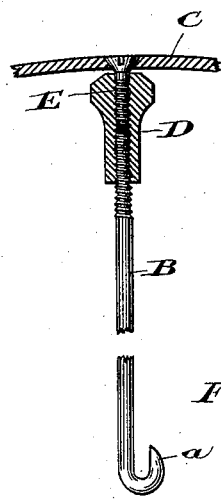

Figure 1 is a perspective view of my improved pulley. Fig. 2 is a detail, partially in section, showing the manner of connecting the spokes to the rim.

In my pulley, A represents the hub, which is preferably flanged, as indicated, or instead of flanges a series of lugs may be formed around the hub, through which holes would be made to admit the hooked ends $a$ of the spokes B. These spokes, it will be noticed, are light metal rods hooked at one end to the hub A and adjustably connected at their other end to the rim C. The two points of connection of each spoke with the hub A and rim C, respectively, are so located that each spoke B shall be substantially at a tangent to the hub A.

D is an oblong nut having a screwed hole passing entirely through it. Into one end of the hole the spoke B is screwed, and a screw, E, passes through the countersunk hole made in the rim C, and the outer end of the nut D. By this construction the spokes can readily be adjusted so as to make the pulley true.

In a pulley constructed as shown in Fig. 1, having spokes set substantially at a tangent to the hub, the motion of the pulley causes a tensile strain on the spokes when the pulley A revolves in one direction and a crushing strain on the spokes when the pulley revolves in the opposite direction, for it is clear if the hub A revolves in the direction indicated by the double-headed arrow the strain on the pulley will be in the direction indicated by the single-headed arrow, and as each spoke B is set substantially at a tangent to its hub there will be an outward or tension strain on each spoke B, and as the metal rods of which the spokes consist will stand a greater strain of this kind than they would a mere cross or breaking strain it is possible to make my pulley of much lighter material than were the spokes arranged to radiate from the center.

I am aware that a wheel with spokes arranged at a tangent to the hub is not new, and therefore do not claim such, broadly. Neither do I claim the construction shown in the Patents Nos. 295,698 and 315,805.

What I claim as my invention is—

In a pulley, the combination, with the flanged hub A and rim C, of the oblong nut D, internally threaded for its entire length, the screw E, passed through the rim and engaging the thread of the nut, and the spoke B, arranged at a tangent to the hub and having at one end a hook, $a$, to engage a hole in the flange of the hub, and its other end threaded and engaging the thread of said nut, substantially as and for the purpose specified.

Toronto, July 31, 1886.

G. CAMPBELL.

In presence of—
CHARLES C. BALDWIN,
F. BARNARD FETHERSTONHAUGH.